Dec. 29, 1959 W. R. JOHNSON 2,919,313

LOW NOISE PREAMPLIFIER

Filed Sept. 4, 1956 2 Sheets-Sheet 1

INVENTOR.
Wayne R. Johnson

BY
Lippincott & Smith
Attorneys

Dec. 29, 1959 W. R. JOHNSON 2,919,313

LOW NOISE PREAMPLIFIER

Filed Sept. 4, 1956 2 Sheets-Sheet 2

INVENTOR.
Wayne R. Johnson
BY
Lippincott + Smith
Attorneys 2,919,313

LOW NOISE PREAMPLIFIER

Wayne R. Johnson, Los Angeles, Calif., assignor, by mesne assignments, to Minnesota Mining & Manufacturing Co., St. Paul, Minn., a corporation of Delaware Application September 4, 1956, Serial No. 607,919

12 Claims. (Cl. 179—100.2)

This invention relates to apparatus for equalizing the frequency response of equipment wherein response to signals of varying frequency is inherently non-uniform. It is particularly adaptable to apparatus for the reproduction of magnetically recorded signals covering a wide band of frequencies but the same principles can be employed in other apparatus, particularly apparatus wherein signals appear initially at very low power levels and where establishment of a constant output level involves great differences in amplification of the different frequencies reproduced.

It is well known that where signals of different frequencies and equal amplitude are magnetically so recorded on a moving tape or other magnetic medium that the degree of magnetization produced on the medium is equal, when played back the output of the transducer head will be directly proportional in amplitude to the signal frequency over a very wide frequency range. Since the rising response characteristic is due to the fact that the signal developed by the pick-up head is proportional to the rate of change of magnetization, and not to the magnetization per se, equalizing networks used to level out the response are, in effect, integrating circuits. The level of power output of the playback heads or transducers is very low. There is always a certain amount of inherent noise developed by irregularities in the recording medium and this noise is largely in the high frequency range. Although the irregularities in magnetization may be very small in comparison with the total magnetization representing a low-frequency signal the rate of change ot such regularities may be very much greater.

Because the signal must be amplified there is added to the inherent noise of the tape thermal and shot noise developed by amplifiers of the ordinary type and, in addition, induced noise from tube heater circuits and tube microphonics are responsible for noises in the range where the transducer-head output is low. Equalization of the low level signals brings up the level of these sources, leading to an unfavorable signal-to-noise ratio.

Above the range wherein the response of the transducer heads rises uniformly with frequency there is a higher frequency range wherein the output of heads plus conventional amplifiers levels off and becomes substantially uniform and then falls. In order to accomplish the leveling off of the high-frequency characteristic rather complex equalization techniques may be necessary. In the high frequency range the signal amplitude falls off due to aperture effect, self demagnetization of the tape, and other less readily defined causes that override the inherent increase in rate-of-change with increase in frequency; in this upper range this increase is a highly desirable aid in extending the response band upward. Where these high-frequency losses become important a simple integrating circuit that would appear ideal at the low-frequency end of the band would completely swallow the high-frequency signals.

Where the band of frequencies to be reproduced is of only moderate width it is relatively easy to obtain a flat overall output from the reproducing equipment. In the reproduction of sound it may be quite possible to use only the rising portion of the frequency response characteristic, in which case frequency compensation requires only a simple integrating network. Where the band width to be reproduced is very wide, as in the case of television signals, the problem becomes very difficult. The customary procedure is to supply the signals from the transducer to an amplifier and equalize them after amplification with what are, in fact, passive networks, even though they may be included in the output circuits of the amplifier itself. The best recording tapes may have an effective dynamic range of as much as 60 db but it is very seldom that so wide a range can be usefully employed. In order to amplify the extremely faint signals representing the low frequencies the amplifiers used must have a very high gain, but they must also be able to accommodate signals received from the head at a 40 or more db higher level and these signals tend to overload the input circuits. The equalizing networks used must provide the necessary integration for the low frequency component but they must not re-integrate the high-frequency components represented by the flat portion of the output curves of the equipment as a whole. The problems of thermal noise, tape noise, hum introduced by the high-gain amplifiers, microphonics and various other effects become quite serious indeed.

Broadly, the object of the present invention is to avoid the difficulties above enumerated, both in magnetic reproducing equipment and in other apparatus wherein comparable problems arise. More specifically, one of the objects of the invention is to provide a means of equalization of apparatus having a non-uniform response by amplifying only the lower amplitude signals instead of by amplifying all signals and attenuating those of high amplitude. Another object of the invention is to provide means for equalizing response curves wihout material introduction of noise and a still further objects is to provide an equalizing amplifier that will not introduce distortion through overloading on signals of high original amplitude. Yet another object equalizing apparatus that is effective over an unusually wide frequency band and that employs very simple and easily adjusted equalizing networks. Other objects and advantages will become apparent in the course of this specification.

In broad terms, in accordance with the present invention a broad-band signal which requires different types of equalization in different portions of the band is supplied to two channels. In the first of these channels the signal is amplified selectively, to bring the low-level components up to the proper amplitude with respect to the higher level components of the unamplified signal. The amplified components from the first channel are then combined additively with the unamplified signals from the second channel.

Although the invention will be described in connection with reproducing or play-back apparatus for magnetically recorded signals it is applicable to other types of apparatus wherein the signals to be operated upon appear at widely differing amplitudes.

In the most usual case such signals appear across a primarily reactive impedance, so that the signal amplitude is substantially in proportion, direct or inverse, to frequency. The impedance may, for example, be a transformer, in which event the two channels may most simply be supplied by a pair of secondary coils.

In reproducers for magnetic recordings the same result is obtained by the use of two coils, preferably equal, disposed on the magnetic circuit of the head. One of these coils is connected across the input terminals of an amplifying element which is preferably a transistor. The output of the amplifying element is an equalizing network whose frequency response characteristic is the inverse of that of the signal source; i.e., in the case of the magnetic reproducer equipment it is an integrating network, the response characteristic of which, throughout the rising portion of the transducer characteristic, is an almost pure capacity reactance. This output network is connected in series with the second of the pick-up coils, and the network is so designed that the outputs of the network and coil are equal at the point where the response of the transducer, plus an amplifier with high-frequency compensation only, approaches uniformity, and beyond this point the amplitude of the amplified signal continues to fall while the amplitude of the unamplified signal from the second coil rises, producing a flat, overall response. The series connection of the amplifier output network and the second pick-up coil forms the simplest and therefore the preferred form of adding circuit for the signals in the two channels. In the preferred form of the apparatus, wherein the amplifying element used is a transistor which has a low input impedance in comparison to that of a vacuum tube, means are provided for preventing this low impedance being reflected back into the second pick-up coil through transformer action between the coils in the head, this being prevented by the inclusion of a choke coil in series with the transistor input. This choke may be so chosen that its impedance is of the same order of magnitude as the transistor impedance at the cut off of the second or wide band pick-up coil and therefore a continually rising impedance as the upper coil takes over the reproducing function. At the ultimate cut off of the apparatus as a whole the reflected impedance is high and the transistor exercises no material loading effect on the reproducer head.

The combined or overall output circuit of the apparatus including the output network of the amplifier and the second transducer winding in series supplies a preamplifier that is of conventional type with the exception that all low frequency integration or equalization is omitted. The invention, therefore, may be considered from two aspects. The broader aspect is that of the separation of the signals into two frequency bands to each of which an appropriate type of equalization, including amplification, can be separately applied. The more specific aspect includes the expedients that permit the use of the low-input-impedance transistor amplifier in combination with the high-input impedance tube amplifier to obtain the advantages of each.

The detailed explanation of a preferred form of the invention which follows is illustrated by the accompanying drawings wherein.

Figure 1:
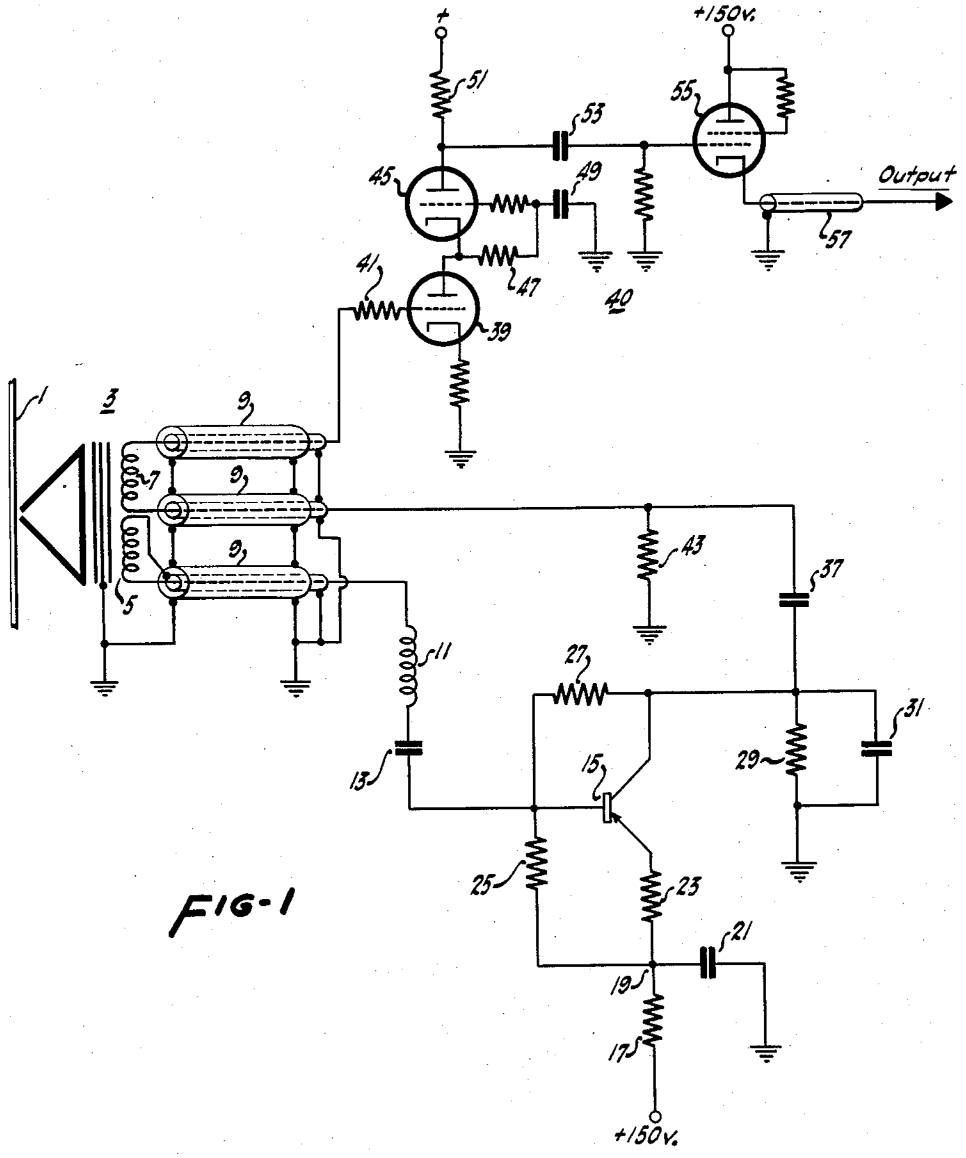
Fig. 1 is a schematic diagram of reproducing apparatus embodying the invention, including the associated equipment from the transducer head up to and including the conventional preamplifier.

In the showing of Fig. 1 the tape on which signals including a wide band of frequencies has been recorded is indicated at the reference character 1. The tape is progressed by a mechanism not shown past a transducer head indicated generally by the reference character 3. This head is conventional except for the fact that it carries two windings instead of one; it comprises a nearly closed ring of ferromagnetic material, the ring being broken by a gap at the point where it contacts the tape. The signals are induced in the two coils by the changes in flux within the gap as the magnetized tape passes it.

The two pick-up coils 5 and 7, disposed upon the ferromagnetic core of the head, are preferably balanced so that the voltages developed in them are equal. The terminals of the two coils are preferably connected to the succeeding equipment through coaxial cables 9 that are provided with additional outer shields, the usual "outer conductor" of the coaxial lines and the additional shields both being grounded at both ends, as shown. This refinement is desirable because of the very low level at which the signals are generated, particularly the low frequency components.

One end of the low frequency coil 5 is grounded. The other terminal connects through the inner conductor of one of the coaxial cables 9, first, to a choke coil 11 and then through a blocking condenser 13 to the base of a transistor 15. The particular equipment described is intended to reproduce signals in a band extending from approximately 300 cycles to 2 mc. The impedance of the transistor, looking into its base circuit, is somewhere in the range of 1600 to 1800 ohms. The cutoff of the equipment, from the conventional head to the conventional preamplifier, is approximately 25 kc. Accordingly, a value of 1150 microhenrys is chosen as that of the choke coil 11; this value is not critical. The blocking condenser 13 should be so selected as to have a low impedance at the desired cutoff frequency of the apparatus as a whole. That shown has a capacity of 25 microfarads; using this value the overall response is down 1 db at 300 cycles and approximately 6 db at 100 cycles. It is possible by using methods other than that employed in the present equipment for biasing the transistor to omit the condenser altogether. For the particular service for which the apparatus described is intended the use of the condenser gives satisfactory results and some simplification in circuitry.

The transistor 15 is of the low noise type designed primarily for use as an intermediate frequency amplifier in television or like equipment. As stated above, the input circuit from the coil 5 connects to the transistor base and the transistor is used in the grounded emitter connection. The transistor being of the PNP, fused junction type, the necessary positive biases are supplied from a source positive to ground. An available source from the following preamplifier supplies a voltage of +150 volts. This is dropped through a resistor 17 to a value of +45 volts at a junction 19, this junction being made an effective ground through a bypass condenser 21 of 40 microfarads.

The junction 19 connects through a 100 ohm resistor 23 to the transistor emitter. The base is biased from the junction through a 10,000 ohm resistor 25. A 220,000 ohm resistor 27 connects to the collector and the latter connects back to ground through an 82,000 ohms resistor 29 that is shunted by a condenser 31, of 0.034 mf. capacity, the condenser 31 and resistor 29 in parallel forming, effectively, the output network of the transistor amplifier. In this circuit the 100 ohm resistor 23 supplies a certain amount of negative feedback in addition to that inherent in the grounded-emitter connection, further stabilizing the operation of the device.

From the values that have been given it will be seen that the output network comprising resistor 29 and condenser 31 looks like a substantially pure capacitance, when viewed from the collector of the transistor, except at the extreme lower limit of the frequency band. It therefore forms an integrating circuit which is substantially the exact inverse of the differentiating circuit formed by the pick-up coil of the playback transducer.

Figure 2:
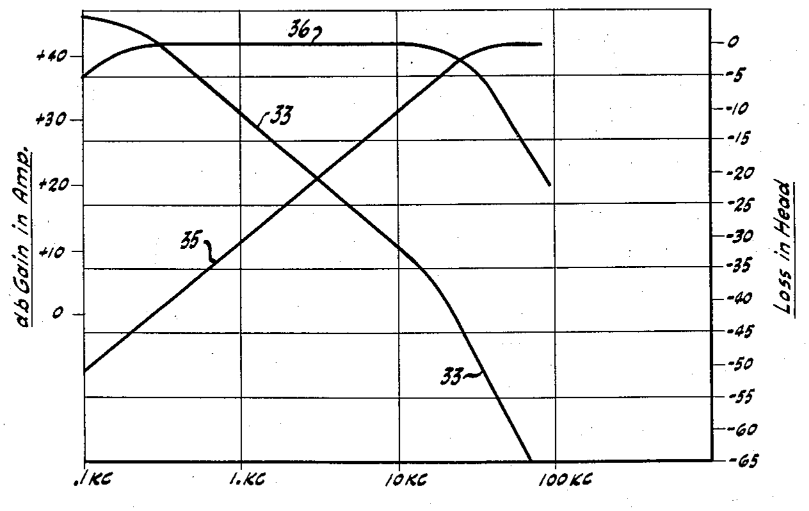
Fig. 2 is a graph showing the frequency characteristics of the transducer head and the equalizing amplifier.

In Fig. 2 curve 33 shows the amplifier gain for signals of constant input amplitude, plotted logarithmically with respect to both frequency and amplitude. Curve 35 shows the output of the playback head to signals recorded at a constant level. The sum of the ordinates of these two curves gives the overall-output characteristic of the equipment up to and including the transistor amplifier and its output network. It will be at once apparent that from approximately 200 cycles to the 25 kc. cut-off, the output is substantially constant. Near the 25 kc. lower cut-off of the head alone where the steady 6 db per octave rise of the head output begins to fall off, the series choke 11 becomes effective to limit the input to the transistor, causing its gain to fall at a somewhat more rapid rate than the uniform 6 db per octave. At the crossover point the outputs of the two channels are equal. Above the crossover the contribution of the amplified signal to the sum of the two outputs quickly becomes negligible. Below the crossover the same is true of the unamplified output of the coil 7 alone. Experiment has proved that a substantially perfect match can be attained. This is illustrated by curve 36, the ordinates whereof are the sum of the ordinates of curves 33 and 35, indicating the output level of the amplifier. It will be recognized that since the coils 5 and 7 are substantially identical curve 35 represents the output of either.

The transistor collector and its output network connect through a blocking condenser 37 to the low potential end of coil 7 on the pickup head through the inner conductor of its connecting coaxial cable 9, and thence, in series with coil 7 and again through the inner conductor of the coaxial cable to the grid of an amplifying tube 39. Because the amplifier inverts the signals, the coils 5 and 7 are connected reversed, so that when coil 5 swings the transistor base negative coil 7 tends to swing the grid of tube 39 positive. Preferably a small series resistor 41, of, say, 68 ohms connects in series with the grid. A grid resistor for tube 39 is provided by the resistor 43 which connects from the input lead to coil 7 directly to ground immediately following the blocking condenser 37. The impedance of resistor 43 is high in comparison with resistor 29 in the transistor output network, while the impedance of the blocking condenser 37 is low as compared to the grid resistor, even at the lowest frequencies to which equalization is carried. With a capacity of 0.25 microfarad for condenser 37 and a resistance of 330,000 ohms for the grid leak 43, the effect upon the frequency characteristic of the apparatus as a whole is too small to be reflected visibly in curves 33, 35 or 36.

The position of the grid resistor 43 in the circuit is important. At the frequencies to which the transistor amplifier responds the grid impedance of tube 39 approaches infinity and the current flow from the network to the tube is therefore infinitesimal. Were the grid resistor connected in its usual position, directly to the tube grid, the current drawn by it would flow through coil 7, and since the latter is coupled inductively to coil 5 there would result a feed-back loop that would result in instability. Connected as shown the arrangement is completely stable, the grid resistor being incorporated in the output network. If some regeneration is desired it can be introduced by an additional resistor at the tube grid, the amount of regeneration being controllable by the ratio of the two resistors.

Tube 39 is the driving element of a cascode amplifier, its anode being connected to and driving the cathode of a grounded grid tube 45. In the particular embodiment of the cascode connection here used, the grid of tube 45 is biased through a resistor 47, connecting from the grid to the plate of the preceding tube, the grid connecting to ground through a blocking condenser 49 of about 0.25 microfarad and the grid resistor having a value in the neighborhood of 500,000 ohms. The output impedance of tube 45 is a resistor 51 of approximately 2,000 ohms value. The plate of tube 45 connects through a blocking condenser 53 to the control grid of a tube 55, connected as a cathode follower, which matches the impedance of the preamplifier to that of the coaxial output line 57 leading, usually, to further amplifiers, wherein any necessary high-frequency equalization is accomplished, and ultimately to the useful load to be fed by the apparatus as a whole.

In order to extend the reproduced frequency band as far into the high-frequency range as possible it will be noted that the load impedance 51 is of a relatively low value. The same will customarily be true as regards the further amplification equipment that follows, but the various accidental capacities in the circuit, bridged across these output resistors, form integrating networks which correct the phase relationships of the apparatus in the high-frequency range. The apparatus will usually also include high frequency equalizers, such as peaking coils, for bringing up the high frequency signal to normal level where they would start to fall off because of the aperture and demagnetization effects already mentioned. Such high frequency equalization is conventional and not a portion of the present invention and is therefore omitted from the showing.

The advantages of the invention may be summed up in the statement that it gives substantially complete equalization with high signal-to-noise ratio. This characteristic is due to several causes. It is well understood that the spectrum of resistance noise, shot noise, etc. is fairly uniformly distributed over the entire band of reproducible frequencies. Tape noise is likely to be troublesome primarily in the high frequency portion of the spectrum. Microphonic noises are troublesome very largely within the audio frequency range.

In apparatus intended to reproduce as wide a band of frequencies as that here described the level of signals in the output of the pick-up coils of the frequencies at the lower end of the band is well below the average noise level and in general may be well below the level of microphonics in tubes that are normally considered to be quiet. It is for this reason that the transistor type of amplifier is preferred for use as here described, since it is inherently free of microphonic noise and there are no heater circuits to introduce hum. Furthermore, its input impedance is relatively low as compared with that of a vacuum tube amplifier and thermal noise is a direct function of input impedance. With the best of the low-noise transistors and inherent noise developed by them is materially lower than the noises they eliminate.

To a first approximation the pick-up coil 5 may be considered as supplying all of the low frequency components to the preamplifier 40 while coil 7 supplies all the high frequency components, taking 25 kc. as the dividing line. Any high frequency noise developed in the output of coil 5 is effectively quenched, being short-circuited to ground through condenser 31 in the transistor output net. Because the low frequencies pass through an additional stage of amplification the conventional preamplifier does not have to be as sensitive as would be the case if it had to handle the low-frequency signals at the level of the transducer head output.

High frequency thermal noise may be developed in the grid resistor 43, but it is effectively shunted to ground through condenser 31, this being the "grounded," low potential side of the coil 7 wherein the high frequency components are primarily developed. Only a small amount of high frequency thermal noise therefore ever reaches the driver tube 39.

Because coils 5 and 7 are closely coupled, the relatively low impedance output coil 5 could load coil 7 and result in a decreased input to tube 39 were it not for the inductor or choke 11. This becomes effective to reduce the amplitude of signals from coil 5 as they appear at the base of the transistor only as the cross-over frequency of 25 kc. is approached. Together with the shunt impedance offered by resistor 25 the choke serves as an element of a cross-over net, leveling out the over-all response of the head and the preamplifiers.

Figure 3:
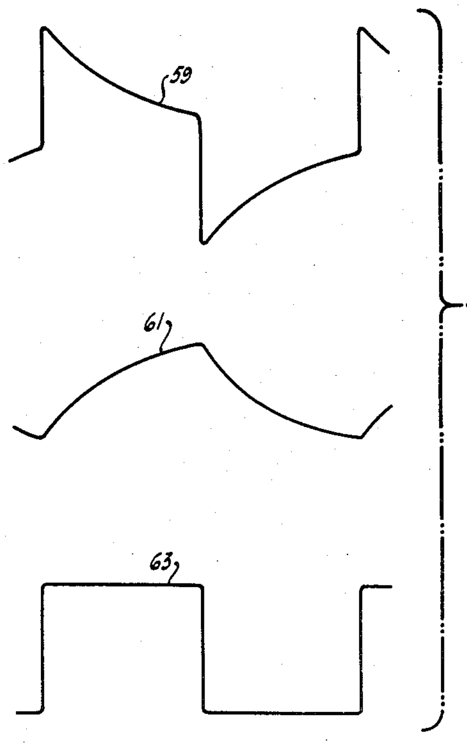
Fig. 3 is a series of curves, showing, respectively, the waveforms as produced at the output of the transducer head, the output of the equalizing amplifier, and the output of the conventional preamplifier wherein the two signals are combined.

The effect of the over-all combination is illustrated by the curves of Fig. 3, showing the waveforms developed at various terminals of the equipment in response to a square wave of approximately 10 kc., recorded without pre-emphasis. The cut-off of the equipment as a whole was 2 mc., and hence the rise time of these waves is approximately one-quarter of a microsecond. This is so short a time in comparison with the period of the waves that their slightly trapezoidal form and the slight rounding of their corners may not be apparent in the reproduction of the drawings. Curve 59 shows the waveform at the output of either coil 5 or 7. The wave rises sharply to a maximum value and then falls off exponentially nearly, but not quite, to zero at the instant of reversal. The waveform is then repeated, reversed, in the second half of the cycle. Curve 61 shows the waveform at the output of the transistor, across the output network. Here the waveform is the inverse of curve 59, the voltage rising exponentially to maximum and then repeating, inverted. Curve 59 contains practically no low frequencies, whereas curve 61 may be considered without material error as consisting of low frequency components only. These curves are added at the grid of tube 39, the resulting waveform being indicated by curve 63, substantially a reproduction of the recorded wave.

The utility of the invention is not limited to magnetic pick-ups. For example, in the design of transformers for a wide frequency band it is difficult to extend response into the high-frequency range without sacrificing low-frequency response; primary reactance falls with frequency, and where this reactance falls to the same order of magnitude as the impedance of the signal source the magnetizing current becomes an important component of the load on the source and the output voltage falls with frequency in the same manner as with a transducer head. Correction of low-frequency response impairs response at high frequencies.

In accordance with the present invention a transformer can be provided with two secondaries, connected in exactly the same manner as coils 5 and 7 of Fig. 1. As the only difference is that magnetization of the core is provided by a primary winding instead of a magnetic tape illustration of this embodiment of the invention is believed unnecessary. By this use of the invention transformers may be designed without compromising the high-frequency response in favor of the low frequencies. To a first approximation the volume and weight of a transformer are inversely proportional to its lower cut-off frequency. It is relatively easy to extend the response band downward by three or more octaves by the use of the present invention, reducing the size of a video-frequency transformer by a factor of 8, and obtaining improved results at less cost. The price and weight of the transistor-amplifier are usually less than the additional cost of the larger transformer. It comes out, too, that the amplitude equalization in this case, as in the case of the magnetic reproducer, also provides proper phase correction.

It should be apparent that signals from the second channel can also be selectively amplified prior to combining them with those of the first, to correct for a differenct kind of amplitude distortion in a second range. This will usually require a different type of adding circuit than a simple series connection, but various types of adding circuits are well known to those skilled in the art. Usually it is more convenient to apply any equalization needed in a second range in an over-all amplifier as described in connection with Fig. 1.

As might be inferred from what has been stated above, some but not all of the advantages of the invention may be obtained by using a vacuum tube amplifier in place of the transistor that has been described in detail. Because at the frequencies over which the amplifier is effective the impedance of the head will almost always be low, the input impedance of a tube amplifier may itself be made relatively low by using a grid resistor of between one or two thousand ohms value and minimizing thermal noise that would otherwise develop where the impedance of the head becomes relatively high. This arrangement does not, however, eliminate the possibility of tube microphonics that are absent in the transistor. With low noise the inherent internally generated noise will not, ordinarily, be greater than the shot noise in a high sensitivity vacuum tube amplifier. Considering the much lower power consumption of the transistor type of device the balance of advantages rests with it. Although the transistor is definitely the amplifier of choice, the use of vacuum tubes in a directly comparable manner to that in which the transistor is here shown lies within the intended scope of the invention. Other circuits than the grounded emitter circuit may be used with transistors. In general, however, they give less amplification and therefore would not ordinarily be used in apparatus intended to handle the widest possible frequency band. Various other modifications of the apparatus shown are possible. The showing here made therefore is not intended to limit the scope of the invention, all intended limitations being specifically expressed therein.

What is claimed is as follows:

1. An equalizing pre-amplifier for wide-band signals requiring different types of equalization in different ranges within the band comprising means for supplying the signals to be amplified simultaneously to two channels, an amplifier element having an input circuit connected in one of said channels, an output network for said amplifying element having an effective impedance that varies substantially linearly with frequency to equalize signals of frequencies within one range within said band, and means for additively combining signals developed across said output network with signals as supplied to the other of said channels to form a single composite signal corresponding to the wide-band signals.

2. An equalizing pre-amplifier for wide-band signals from apparatus the response whereof to signals of varying frequency varies as a continuous function of frequency over a portion only of the band, comprising means for supplying all of the signals from said apparatus simultaneously to two channels, an amplifying element having an input circuit connection in one of said channels, an output network for said amplifying element having an effective impedance that varies substantially linearly with frequency over said portion of the band, and means for additively combining signals developed across said output network with signals as supplied to the other of said channels.

3. An equalizing pre-amplifier for wide-band signals requiring different types of equalization in different ranges within the band comprising means for supplying the signals to be amplified simultaneously to two channels, an amplifier element having an input circuit connected in one of said channels, an output network for said amplifying element having an effective impedance that varies substantially linearly with frequency to equalize signals of frequencies within one range within said band, and means for additively combining signals developed across said output network with signals as supplied to the other of said channels, said amplifying element being current-actuated and including means operative within the other of said ranges for substantially reducing current flow to said amplifying element.

4. The invention as defined in claim 2 wherein said means for supplying signals to two channels comprises a pair of coils disposed on a single magnetic circuit with one of said coils supplying signals to one of said channels and the other of said coils supplying signals to the other of said channels.

5. An equalizing amplifier for use in apparatus having a non-uniform frequency response comprising a pair of inductively coupled coils wherein the signals to be amplified are induced, an amplifier having an input circuit connected across one of said coils and an output circuit for said amplifier having a frequency-response characteristic inverse to that of said apparatus and connected in series with the other of said coils for connection to an over-all output circuit.

6. An equalizing amplifier adapted for use in apparatus for reproducing magnetically recorded signals comprising a transducer head having two pick-up coils disposed thereon, an amplifying element having input terminals connected across one of said heads, an output circuit for said amplifying element comprising a resistance-capactitance network connected in series with the second of said pick-up coils, and additional amplifying apparatus connected for supply by said output circuit and second coil in series.

7. An equalizing amplifier adapted for use in apparatus for reproducing magnetically recorded signals the response whereof to such signals rises substantially uniformly with increasing frequency over a lower band of frequencies and becomes substantially uniform over a higher band of frequencies, which comprises a pair of windings wherein the signals to be reproduced are induced, an amplifying element connected across one of said coils, an output network for said amplifying element having a frequency response substantially inverse to that of said reproducing apparatus over the rising portion thereof, and an over-all output circuit including said output network and the other of said pick-up coils in series.

8. In reproducing apparatus for magnetically recorded signals, a transducer head including a pair of pick-up coils disposed thereon, a transistor having input terminals connected across one of said coils, output terminals on said transistor, a predominantly capacitive output network connected to said output terminals, and an output circuit including said output network and the other of said pick-up coils in series.

9. The invention as set forth in claim 8 including, in addition, a choke coil connected in series between said first mentioned pick-up coil and said input terminals.

10. An equalizing amplifier for inductively developed signals comprising a pair of coils wherein said signals are induced, a transistor amplifier having an input circuit connected across one of said coils, a predominantly capacitive output network for said transistor connected in series with the other of said coils to combine additively voltages developed across said network with voltages developed in said other coil, and a vacuum-tube amplifier having a grid circuit connected across said output network and said other coil in series, said output network including a grid resistor for said vacuum tube amplifier.

11. An equalizing amplifier in accordance with claim 10 including an inductive impedance element connected in series between said one coil and the input circuit of said transistor.

12. An equalizing preamplifier for wide-band signals requiring different types of equalization in different ranges within the wide-band signals, including, means for supplying the wide-band signals to be amplified simultaneously to two channels, transistor means coupled to one of said channels for equalizing the wide-band signals in one particular range thereof, means coupled to said equalizing means for effectively de-coupling said equalizing means from said one channel for signals of frequencies which are not within said particular range, and means coupled to said equalizing means and to the other of said channels for combining the equalized signals from said equalizing means with the signals from said other channel to form composite signals equalized over said particular range.

References Cited in the file of this patent

UNITED STATES PATENTS

| | | |
|---|---|---|
| Re. 23,919 | Hawkins | Jan. 11, 1955 |
| 2,629,784 | Daniels | Feb. 24, 1953 |
| 2,685,618 | Rettinger | Aug. 3, 1954 |
| 2,704,789 | Kornei | Mar. 22, 1955 |